United States Patent
Hassan et al.

(10) Patent No.: US 8,842,752 B2
(45) Date of Patent: *Sep. 23, 2014

(54) FEC IN COGNITIVE MULTI-USER OFDMA

(75) Inventors: Amer A. Hassan, Kirkland, WA (US); Christian Huitema, Clyde Hill, WA (US); Wayne Stark, Detroit, MI (US); Yunnan Wu, Seattle, WA (US); Philip Andrew Chou, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/052,667

(22) Filed: Mar. 21, 2011

(65) Prior Publication Data

US 2011/0173485 A1      Jul. 14, 2011

Related U.S. Application Data

(63) Continuation of application No. 11/731,269, filed on Mar. 30, 2007, now Pat. No. 7,929,623.

(51) Int. Cl.
*H04L 27/28* (2006.01)
*H04L 5/00* (2006.01)
*H04L 1/00* (2006.01)

(52) U.S. Cl.
CPC ............ *H04L 5/0046* (2013.01); *H04L 5/006* (2013.01); *H04L 1/0071* (2013.01); *H04L 5/0041* (2013.01); *H04L 5/0007* (2013.01); *H04L 1/0045* (2013.01); *H04L 5/0058* (2013.01); *H04L 2001/0093* (2013.01)
USPC .......................................... 375/260; 375/316

(58) Field of Classification Search
USPC ......................................... 375/260, 295, 316
See application file for complete search history.

(56) References Cited

U.S. PATENT DOCUMENTS

| 3,343,093 A | 9/1967 | Gerwen |
| 4,210,780 A | 7/1980 | Hopkins et al. |

(Continued)

FOREIGN PATENT DOCUMENTS

| CN | 1468486 | 1/2004 |
| CN | 1723676 | 1/2006 |

(Continued)

OTHER PUBLICATIONS

"About SDR Technology," 1 http://www.sdrforum.org/pages/aboutSdrTech/aboutSdrTech.asp, 1 pg, 2007.

(Continued)

*Primary Examiner* — Emmanuel Bayard
(74) *Attorney, Agent, or Firm* — John Jardine; Andrew Sanders; Micky Minhas (57) ABSTRACT

A multiuser scheme allowing for a number of users, sets of user, or carriers to share one or more channels is provided. In the invention, the available channel bandwidth is subdivided into a number of equal-bandwidth subchannels according to standard OFDM practice. A transmitter transmits data on a set of OFDM subchannels that need not be contiguous in the spectrum or belong to the same OFDM channel. A receiver receives and decodes the data and detects errors on subchannels. The receiver then broadcasts the identity of those subchannels on which the error rate exceeds a specific threshold, and the transmitter may select different subchannels for transmission based on this information.

20 Claims, 5 Drawing Sheets

(56) References Cited

U.S. PATENT DOCUMENTS

| | | | |
|---|---|---|---|
| 5,504,775 A | 4/1996 | Chouly et al. | |
| 5,729,535 A | 3/1998 | Rostoker | |
| 5,790,516 A | 8/1998 | Gudmundson et al. | |
| 5,867,478 A | 2/1999 | Baum et al. | |
| 6,175,550 B1 | 1/2001 | Van Nee | |
| 6,295,272 B1 | 9/2001 | Feldman | |
| 6,304,611 B1 | 10/2001 | Miyashita et al. | |
| 6,456,653 B1* | 9/2002 | Sayeed | 375/227 |
| 6,553,534 B2 | 4/2003 | Yonge, III et al. | |
| 6,609,039 B1 | 8/2003 | Schoen | |
| 6,654,431 B1 | 11/2003 | Barton et al. | |
| 6,704,572 B1* | 3/2004 | Whinnett et al. | 455/452.1 |
| 6,721,267 B2 | 4/2004 | Hiben | |
| 6,726,297 B1 | 4/2004 | Uesugi | |
| 6,728,551 B2 | 4/2004 | Chang | |
| 6,763,072 B1 | 7/2004 | Matsui et al. | |
| 6,810,006 B2 | 10/2004 | Michon et al. | |
| 6,870,808 B1 | 3/2005 | Liu et al. | |
| 6,882,851 B2 | 4/2005 | Sugar et al. | |
| 6,904,283 B2 | 6/2005 | Li et al. | |
| 6,934,246 B2 | 8/2005 | Park | |
| 6,934,340 B1 | 8/2005 | Dollard | |
| 6,952,454 B1 | 10/2005 | Jalali et al. | |
| 6,961,388 B2 | 11/2005 | Ling et al. | |
| 6,976,202 B1 | 12/2005 | Rezvani et al. | |
| 6,987,729 B1 | 1/2006 | Gopalakrishnan et al. | |
| 7,012,883 B2 | 3/2006 | Jalali et al. | |
| 7,020,071 B2 | 3/2006 | Mujtaba | |
| 7,020,073 B2 | 3/2006 | Kadous et al. | |
| 7,035,201 B2 | 4/2006 | Fu | |
| 7,043,023 B2 | 5/2006 | Watanabe et al. | |
| 7,043,681 B2 | 5/2006 | Kroeger et al. | |
| 7,047,032 B2 | 5/2006 | Yun | |
| 7,072,413 B2 | 7/2006 | Walton et al. | |
| 7,075,967 B2 | 7/2006 | Struhsaker et al. | |
| 7,076,246 B2 | 7/2006 | Chitrapu | |
| 7,126,984 B2 | 10/2006 | Wang | |
| 7,133,471 B2 | 11/2006 | Feher | |
| 7,151,755 B2 | 12/2006 | Xu | |
| 7,151,925 B2 | 12/2006 | Ting et al. | |
| 7,164,649 B2 | 1/2007 | Walton et al. | |
| 7,206,350 B2 | 4/2007 | Korobkov et al. | |
| 7,206,840 B2 | 4/2007 | Choi et al. | |
| 7,286,603 B2* | 10/2007 | Varshney et al. | 375/260 |
| 7,333,531 B2 | 2/2008 | Alamouti | |
| 7,356,343 B2 | 4/2008 | Feher | |
| 7,414,964 B2 | 8/2008 | Hashem | |
| 7,415,085 B2 | 8/2008 | Fujii | |
| 7,450,559 B2 | 11/2008 | Schotten | |
| 7,551,641 B2 | 6/2009 | Pirzada | |
| 7,623,599 B2 | 11/2009 | McCoy | |
| 1,634,016 A1 | 12/2009 | Hassan | |
| 7,627,048 B2 | 12/2009 | Larsson | |
| 7,672,221 B2 | 3/2010 | Fuji | |
| 7,672,381 B1 | 3/2010 | Kleider | |
| 7,800,541 B2 | 9/2010 | Moshfeghi | |
| 7,813,701 B2 | 10/2010 | Strong | |
| 7,855,948 B2 | 12/2010 | Anikhindi | |
| 7,877,110 B2 | 1/2011 | Feher | |
| 7,929,623 B2 | 4/2011 | Hassan | |
| 7,933,344 B2 | 4/2011 | Hassan | |
| 7,970,085 B2 | 6/2011 | Hassan | |
| 8,072,957 B2 | 12/2011 | Gross | |
| 8,144,793 B2 | 3/2012 | Hassan | |
| 8,166,534 B2 | 4/2012 | Yariv | |
| 8,189,621 B2 | 5/2012 | Hassan | |
| 8,228,850 B2 | 7/2012 | McBeath | |
| 8,249,001 B2 | 8/2012 | Oota | |
| 8,320,506 B2 | 11/2012 | Jo | |
| 8,374,130 B2 | 2/2013 | Hassan | |
| 2002/0031189 A1 | 3/2002 | Hiben | |
| 2002/0119781 A1 | 8/2002 | Li | |
| 2002/0141446 A1 | 10/2002 | Koga | |
| 2002/0157058 A1 | 10/2002 | Ariel | |
| 2002/0188723 A1 | 12/2002 | Choi et al. | |
| 2003/0015423 A1 | 1/2003 | LaGreca | |
| 2003/0026201 A1 | 2/2003 | Fu et al. | |
| 2003/0058786 A1 | 3/2003 | Sato et al. | |
| 2003/0067961 A1 | 4/2003 | Hudson | |
| 2003/0112880 A1 | 6/2003 | Walton | |
| 2003/0123383 A1 | 7/2003 | Korobkov et al. | |
| 2003/0154233 A1 | 8/2003 | Patterson | |
| 2003/0223354 A1 | 12/2003 | Olszewski | |
| 2004/0005010 A1 | 1/2004 | He et al. | |
| 2004/0008618 A1 | 1/2004 | Shirakata et al. | |
| 2004/0027997 A1 | 2/2004 | Terry et al. | |
| 2004/0029575 A1 | 2/2004 | Mehta | |
| 2004/0073929 A1 | 4/2004 | Morello | |
| 2004/0081121 A1 | 4/2004 | Xu | |
| 2004/0151108 A1 | 8/2004 | Claret et al. | |
| 2004/0151109 A1 | 8/2004 | Batra et al. | |
| 2004/0252775 A1 | 12/2004 | Park | |
| 2004/0252781 A1 | 12/2004 | Park | |
| 2005/0002325 A1 | 1/2005 | Giannakis et al. | |
| 2005/0013238 A1 | 1/2005 | Hansen | |
| 2005/0025039 A1 | 2/2005 | Hwang et al. | |
| 2005/0027789 A1 | 2/2005 | Luo et al. | |
| 2005/0047259 A1 | 3/2005 | Ahn | |
| 2005/0063345 A1 | 3/2005 | Wu et al. | |
| 2005/0078759 A1 | 4/2005 | Zhang | |
| 2005/0085249 A1 | 4/2005 | Goldstein | |
| 2005/0099937 A1 | 5/2005 | Oh et al. | |
| 2005/0111462 A1 | 5/2005 | Walton et al. | |
| 2005/0117661 A1 | 6/2005 | Kim | |
| 2005/0129136 A1 | 6/2005 | Fujii | |
| 2005/0130684 A1 | 6/2005 | Kim et al. | |
| 2005/0141649 A1 | 6/2005 | Tanabe | |
| 2005/0152466 A1 | 7/2005 | Maltsev et al. | |
| 2005/0157670 A1 | 7/2005 | Tang et al. | |
| 2005/0157805 A1 | 7/2005 | Walton | |
| 2005/0160428 A1 | 7/2005 | Ayachitula et al. | |
| 2005/0180313 A1 | 8/2005 | Kim | |
| 2005/0197132 A1 | 9/2005 | Lee et al. | |
| 2005/0228850 A1 | 10/2005 | Zhu et al. | |
| 2005/0232208 A1 | 10/2005 | Hansen | |
| 2005/0237989 A1 | 10/2005 | Ahn et al. | |
| 2005/0245197 A1 | 11/2005 | Kadous et al. | |
| 2005/0249127 A1 | 11/2005 | Huo | |
| 2006/0009209 A1 | 1/2006 | Rieser et al. | |
| 2006/0034382 A1 | 2/2006 | Ozluturk et al. | |
| 2006/0045001 A1 | 3/2006 | Jalali | |
| 2006/0046716 A1 | 3/2006 | Hofstaedter et al. | |
| 2006/0056283 A1 | 3/2006 | Anikhindi | |
| 2006/0063543 A1 | 3/2006 | Matoba | |
| 2006/0078059 A1 | 4/2006 | Ok et al. | |
| 2006/0083157 A1 | 4/2006 | Cheng | |
| 2006/0083210 A1 | 4/2006 | Li et al. | |
| 2006/0094372 A1 | 5/2006 | Ahn | |
| 2006/0126493 A1* | 6/2006 | Hashem et al. | 370/208 |
| 2006/0128318 A1 | 6/2006 | Agarossi et al. | |
| 2006/0135075 A1 | 6/2006 | Tee et al. | |
| 2006/0154691 A1 | 7/2006 | Tang et al. | |
| 2006/0159120 A1 | 7/2006 | KIm | |
| 2006/0171445 A1 | 8/2006 | Batra et al. | |
| 2006/0176973 A1 | 8/2006 | Alamouti | |
| 2006/0188003 A1 | 8/2006 | Larsson | |
| 2006/0188031 A1 | 8/2006 | Liu | |
| 2006/0193295 A1 | 8/2006 | White et al. | |
| 2006/0211387 A1 | 9/2006 | Pisek et al. | |
| 2006/0211395 A1 | 9/2006 | Waltho | |
| 2006/0234752 A1 | 10/2006 | Mese | |
| 2006/0250944 A1 | 11/2006 | Hong et al. | |
| 2006/0269005 A1 | 11/2006 | Laroia et al. | |
| 2006/0287001 A1 | 12/2006 | Budampati et al. | |
| 2007/0002728 A1 | 1/2007 | Fujii | |
| 2007/0009056 A1 | 1/2007 | Yeon et al. | |
| 2007/0016413 A1 | 1/2007 | Seo et al. | |
| 2007/0032220 A1 | 2/2007 | Feher | |
| 2007/0055501 A1 | 3/2007 | Aytur et al. | |
| 2007/0058583 A1 | 3/2007 | Cho | |
| 2007/0078924 A1 | 4/2007 | Hassan et al. | |
| 2007/0086420 A1 | 4/2007 | Schotten | |
| 2007/0116137 A1 | 5/2007 | McCoy | |
| 2007/0133387 A1 | 6/2007 | Arslan et al. | |

(56) References Cited

U.S. PATENT DOCUMENTS

| | | | |
|---|---|---|---|
| 2007/0189162 A1* | 8/2007 | Song et al. | 370/230 |
| 2007/0248173 A1 | 10/2007 | Hassan | |
| 2007/0263653 A1 | 11/2007 | Hassan | |
| 2008/0057869 A1 | 3/2008 | Strong | |
| 2008/0137634 A1 | 6/2008 | Hassan | |
| 2008/0232340 A1 | 9/2008 | Wan et al. | |
| 2008/0232490 A1 | 9/2008 | Gross | |
| 2008/0279291 A1 | 11/2008 | Hassan | |
| 2009/0086706 A1 | 4/2009 | Huang | |
| 2009/0109914 A1 | 4/2009 | McBeath | |
| 2009/0190535 A1 | 7/2009 | Hassan | |
| 2009/0262849 A1 | 10/2009 | Jo | |
| 2010/0040167 A1 | 2/2010 | Aoki | |
| 2010/0165956 A1* | 7/2010 | Razzell | 370/338 |
| 2010/0208852 A1 | 8/2010 | Feher | |
| 2011/0235732 A1 | 9/2011 | Hassan | |
| 2012/0128034 A1 | 5/2012 | Feher | |
| 2012/0182875 A1 | 7/2012 | Hassan | |
| 2012/0201317 A1 | 8/2012 | Hassan | |
| 2012/0207233 A1 | 8/2012 | Hassan | |

FOREIGN PATENT DOCUMENTS

| | | |
|---|---|---|
| CN | 1874334 | 12/2006 |
| EP | 1 156 598 A2 | 11/2001 |
| EP | 1 560 344 | 8/2005 |
| EP | 1 571 773 A2 | 9/2005 |
| EP | 1 578 162 | 9/2005 |
| JP | 08-047036 | 2/1996 |
| JP | 2001-285236 | 10/2001 |
| JP | 2004-158965 | 6/2004 |
| JP | 2005-167502 | 6/2005 |
| JP | 2005-244997 | 9/2005 |
| JP | 2005-260921 | 9/2005 |
| JP | 2006-287344 | 10/2006 |
| KR | 1020050052847 A | 6/2005 |
| NZ | 505658 | 2/2003 |
| RU | 2219665 | 12/2003 |
| TW | 1256789 | 6/2006 |
| TW | 1257779 | 7/2006 |
| WO | WO 96/23371 | 8/1996 |
| WO | WO 00/74415 | 12/2000 |
| WO | 02/32161 | 4/2002 |
| WO | WO 02/33925 | 4/2002 |
| WO | WO 02/49306 | 6/2002 |
| WO | WO 02093839 A2 | 11/2002 |
| WO | WO 03/088602 | 10/2003 |
| WO | WO 2004/075499 | 9/2004 |
| WO | 2005/060192 A1 | 6/2005 |
| WO | WO 2005/066914 | 7/2005 |
| WO | WO 2005125250 A1 | 12/2005 |
| WO | 2006/004466 | 1/2006 |
| WO | WO 2007/062754 | 6/2007 |
| WO | WO 2005076557 A1 | 8/2007 |
| WO | WO 2007/108077 | 9/2007 |

OTHER PUBLICATIONS

"Orthogonal Frequency Division Multiple Access," Wikipedia Online Encyclopedia; retrieved from http://en.wikipedia.org/wiki/ofdma, published Nov. 25, 2006, downloaded on Dec. 12, 2006, pp. 1-3.
"Software defined radio," http://www.wipro.com/webpages/insights/softwareradio.htm, 1 pg, 2007.
"Software Defined Radio", http://www.altera.com/end-markets/wireless/software/sdr/wir-sdr.html, 4 pgs.
Atarashi, H., "Broadband packet wireless access appropriate for high-speed and high-capacity throughput," Vehicular Technology Conference, 2001, pp. 566-570, vol. 1, Issue 2001.
Blestas et al., "Efficient Collaborative (Viral) Communication in OFDM Based WLANs", Proceedings of IEEE/ITS International Symposium on Advanced Radio Technologies (ISART 2003), Institute of Standards and Technology, Boulder Colorado, Mar. 4-7, 2003, pp. 27-32.
Brodersen, et al. "Corvus: a cognitive radio approach for usage of virtual unlicensed spectrum." Online. http://www.tkn.tu-berlin.de/publications/papers/CR_White_paper_final.pdf, 2004.
Cabric, et al., "A Cognitive Radio Approach for Usage of Virtual Unlicensed Spectrum," In Proc. of 14th IST Mobile Wireless Communications Summit 2005, Dresden Germany, Jun. 2005, 4 pages unnumbered.
Chiani, et al., "Ultra Wide Bandwidth Communications towards Cognitive Radio," EMC Europe Workshop, http://www-site.deis.unibo.it/Staff/giorgetti/pubblicazioni/Conferences/emc05_mcaggl.pdf, 2005, pp. 114-117, Rome, Italy.
Goeckel, et al., "On the Design of Multidimentional Signal Sets for OFDM Systems," IEEE Transactions on Communications, vol. 50 No. 3, pp. 442-452, Mar. 2002.
Goeckel, "Coded Modulation With Non-Standard Signal Sets for Wireless OFDM Systems," IEEE, pp. 791-795, 1999.
International Search Report from International Application No. PCT/US2007/010020, Search dated Nov. 5, 2007.
International Search Report from International Application No. PCT/US2007/085556, Search dated Mar. 26, 2008.
International Search Report from International Application No. PCT/US2007/011642, Search dated Sep. 28, 2007.
International Search Report from International Application PCT/US2007/010021, Search dated Oct. 17, 2007.
Johnsson, "HiperLAN/2—The Broadband Radio Transmission Technology Operating in the 5 GHz Frequency Band," HiperLAN/2 Global Forum, 1999, Version 1.0.
Krenik, et al., "Cognitive Radio Techniques for Wide Area Networks," Annual ACM IEEE Design Automation Conference, Proceedings of the 42nd Annual Conference on Design Automation, 2005, pp. 409-412, San Diego, USA, ISBN:1-59593-058-2.
Li, et al., "Clustered OFDM with Channel Estimation for High Rate Wireless Data," IEEE, 1999, pp. 43-50.
Mitola, III, et al., "Cognitive Radio an Integrated Agent Architecture for Software Defined Radio," *Royal Institute of Technology* (*KTH*), Teleinformatics Electrum 204, SE-164 40 Kista Sweden, pp. title page through 304, May 8, 2000.
Mitola, et al., Absract from "Cognitive Radio: Making Software Radios More Personal," Personal Communications, IEEE, Aug. 1999, vol. 6, Issue 4, pp. 13-18, Stockholm, Sweden, ISSN: 1070-9916.
Okada, et al., "Pre-DFT Combining Space Diversity Assisted COFDM," IEEE Transactions on Vehicular Technology, vol. 50, No. 2, pp. 487-496, Mar. 2001.
Pottie, "Wireless Multiple Access Adaptive Communications Techniques," Online. http://www.ee.ucla.edu/~pottie/papers/encyc1.pdf, 1999.
Sereni et al., "A Software *Radio OFDM* Transceiver for WLAN Applications," Electronic and Information Engineering Department(DIEI)—University of Perugia—Italy, pp. 1-14, Apr. 2001.
She, et al., "Adaptive Turbo Coded Modulation for OFDM Transmissions," Communication Technology Proceedings, 2003. ICCT 2003., Apr. 9-11, 2003, pp. 1491-1495, vol. 2, Beijing, China.
Tewfik, et al., "High Bit Rate Ultra-Wideband OFDM," Global Telecommunications Conference, 2002. GLOBECOM apos;02. IEEE, Nov. 2002, pp. 2260-2264, vol. 3.
Wang, et al., "Complex-Field Coding for OFDM Over Fading Wireless Channels," IEEE Transactions on Information Theory, Mar. 2003, pp. 707-720, vol. 49, No. 3.
Wong, et al., "Multiuser OFDM with Adaptive Subcarrier, Bit, and Power Allocation," *IEEE Journal on Selected Areas in Communications*, vol. 17, No. 10, Oct. 1999, pp. 1747-1758.
Written Opinion from International Application No. PCT/US2007/010020, Search dated Nov. 5, 2007.
Written Opinion from International Application No. PCT/US2007/085556, Search dated Mar. 26, 2008.
Written Opinion from International Application No. PCT/US2007/011642, Search dated Sep. 28, 2007.
Written Opinion from International Application PCT/US2007/010021, Search dated Oct. 17, 2007.
Youngblood, "A Software-Defined Radio for the Masses, Part 1," http://www.ece.jhu.edu/~cooper/SWRadio/Yblood1.pdf, Jul./Aug. 2002, pp. 1-9.
Zhang, et al., "Adaptive OFDM System Design for Cognitive Radio," In: 11th International OFDM-Workshop, Aug. 30-31, 2006, Hamburg, Germany, pp. 91-95, IEEE Communications Society.

(56) References Cited

OTHER PUBLICATIONS

Baumgartner, et al., "Performance of Forward Error Correction for IEEE 802.16e," University of Ulm. http://tait.e-technik.uni-ulm.de/~richter/papers/ofdm2005.pdf.
Lawrey, et al., "Adaptive Frequency Hopping for Multiuser OFDM," James Cook University. http://www.skydsp.com/resources/icics99_361withHeader.pdf.
Wahlqvist, et al., "A Conceptual Study of OFDM-based Multiple Access Schemes," Telia, Jun. 5, 1996. http://www.es.lth.se/home/oes/pdfs/etsi1.pdf.
Examiner's First Report dated Aug. 18, 2010 from Australian Patent Application No. 2007333404.
Tejera et al., "Subchannel Allocation in Multiuser Mutliple Input Mutliple Output Systems," IEEE Transactions on Information Theory. Jul. 4, 2006. pp. 1-34.
Office Action in corresponding Chinese Application No. 200780015172.4 dated Dec. 30, 2010.
Examiner's First Report on Australian patent application No. 2007243348, May 24, 2010.
Taiwan Search Report for TW 096116940, dated Sep. 8, 2010, 1 page.
PCT Written Opinion and International Search Report, Reference 321714.02 WO, Application No. PCT/US2008/087860, May 21, 2009.
Alonistioti, "End-to-End Reconfigurability: Evolution on Reconfiguration Metamodel", OMG SBC 2005, Aug. 17, 2005.
Bard, "Joint Tactical Radio System", Space Coast Communication Systems Inc., 2003.
Bourse, "End-to-End Reconfigurability (E2R): Enabling, Interoperability, Management and Control of Complex Heterogeneous Systems", URSI GA 2005, Oct. 2005.
Sgandurra, "Achieving SCA Compliance for COTS Software Defined Radio, Second Edition", Pentek, 2006.
CN Notice on the Second Office Action for Application No. 200780016912.6, Jan. 7, 2013.
CN Notice on the First Office Action for Application No. 200780045500.5, Jan. 31, 2012.
CN Notice on the First Office Action for Application No. 200780016912.6, Mar. 31, 2012.
CN Notice on the First Office Action for Application No. 200880125896.9, Aug. 27, 2012.
JP Notice of Reason for Rejection for Application No. 2009--507775, Mar. 21, 2012.
JP Notice of Reason for Rejection for Application No. 2009-509894, Mar. 21, 2012.
Schiphorst, A Bluetooth-enabled HiperLAN/2 receiver. Proceedings of the IEEE 58th Vehicular Technology Conference, Oct. 6-9, 2003.
EP Communication for Application No. 08747424.3-1525/2143222 PCT/US2008062321, reference FB22296, Aug. 22, 2012.
Rhee, Increase in Capacity of Multiuser OFDM System Using Dynamic Subchannel Allocation, May 15, 2000. XP-000968037.
CN First Office Action for Application No. 200880015382.8, Jun. 5, 2012.
CN Notice on the Second Office Action for Application No. 200780045500.5, Nov. 9, 2012.
EP Communication for Application No. 07777062.6-1854/2018718 PCT/US2007011642, Reference FB20744, Mar. 8, 2013.
JP Notification of Reason for Rejection for Application No. 2010-544299, Apr. 18, 2013.
JP Notice of Rejection for Application No. 2009-541463, Oct. 19, 2012.
CN Decision on Rejection for Application No. 200780045500 5, Feb. 5, 2013.
EP Communication for Application No. 08747424.3-1505, Reference FB22296, Apr. 10, 2013.
CN Notice on the Second Office Action for Application No. 200880125896.9, Dec. 19, 2012.
CN Notice on the Second Office Action for Application No. 200880015382.8, Feb. 8, 2013.

Chang, "Synthesis of Band-Limited Orthogonal Signals for Multichannel Data Transmission", Aug. 4, 1966.
CN Decision on Rejection for Application No. 200780045500.5, Feb. 5, 2013.
TW Search Report for Application No. 096114706, Date of Research: Mar. 14, 2013.
CN Decision on Rejection for Application No. 200880125896.9, Jul. 29, 2013.
JP Office Action for Application No. 2009-541463, Jul. 19, 2013.
Baumgartner, "Performance of Forward Error Correction for IEEE 802.16e", in Proceedings of the 10th international OFDM Workshop, Aug. 31-Sep. 1, 2005.
Lawrey, "Adaptive Frequency Hopping for Multiuser OFDM", in Proceedings of the Second international Conference on Information, Communications & Signal Processing, Dec. 7-10, 1999.
"Software Defined Radio", Altera®, archived on Feb. 20, 2007 on web.archive.org/web/20070220093349/http://www.altera.com/end-markets/wireless/software/sdr/wir-sdr.html.
JP Notification of reason for rejection for Application No. 2010-544299, Drafting date Jul. 29, 2013.
KR Notice of Preliminary Rejection and Reasons for Rejection for Application No. 10-2008-7025732, Reference No. 316361.13, Jun. 30, 2013.
CN Notice on the Third Office Action for Application No. 200880015382.8, Aug. 22, 2013.
CN Decision on Rejection for Application No. 200880125896.9, Summary of the Final Rejection included, Jul. 29, 2013.
EP Summons to attend oral proceedings for Application No. 08747424.3-1505/2143222, Reference FB22296, Sep. 12, 2013.
U.S. Appl. No. 11/731,269, filed Feb. 30, 2007, Hassan.
U.S. Appl. No. 11/410,969, filed Apr. 25, 2006, Hassan.
U.S. Appl. No. 11/433,804, filed May 12, 2006, Hassan.
U.S. Appl. No. 13/449,312, filed Apr. 18, 2012, Hassan.
U.S. Appl. No. 13/452,637, filed Apr. 20, 2012, Hassan.
U.S. Appl. No. 11/637,449, filed Dec. 12, 2006, Hassan.
U.S. Appl. No. 13/427,494, filed Mar. 22, 2012, Hassan.
U.S. Appl. No. 60/928,114, filed May 8, 2007, Hassan.
U.S. Appl. No. 11/899,248, filed Sep. 5, 2007, Hassan.
U.S. Appl. No. 13/153,801, filed Jun. 6, 2011, Hassan.
U.S. Appl. No. 12/020,212, filed Jan. 25, 2008, Hassan.
U.S. Appl. No. 13/763,671, filed Feb. 9, 2013, Hassan.
CN Notice on the Third Office Action for Application No. 200880015382.8, Summary of the Third Office Action included. Aug. 22, 2013.
JP Secondary Office Action for Application No. 2009-541463, Dec. 3, 2013.
KR Notice of Preliminary Rejection for Application No. 10-2009-7014172, Nov. 25, 2013.
EP Summons to attend oral proceedings for Application No. 08747424.3-1505/2143222, Reference FB22296, Jan. 17, 2014.
KR Notice of Preliminary Rejection for Application No. 10-2014-7000529, Feb. 10, 2014.
EP Communication for Application No. 07794366.0-1860/2011296PCT/US2007010020, Reference FB20700, Apr. 8, 2014.
Kivanc, "Computationally Efficient Bandwidth Allocation and Power Control for OFDMA", IEEE Transactions on Wireless Communications, vol. 2, No. 6, Nov. 2003.
Yin, "An Efficient Multiuser Loading Algorithm for OFDM-based Broadband Wireless Systems", Proceedings of the Global Telecommunications Conference, Nov. 27-Dec. 1, 2000.
CN Notice on the Fourth Office Action for Application No. 200880015382.8, Mar. 14, 2014.
EP Provision of the minutes for Application No. 08747424.3-1505, Reference FB22296, Feb. 14, 2014.
EP Decision to refuse for Application No. 08747424.3-1505, Reference FB22296, Feb. 14, 2014.
U.S. Appl. No. 14/104,027, filed Dec. 12, 2013, Amer A. Hassan.
U.S. Appl. No. 14/256,709, filed Apr. 18, 2014, Amer A. Hassan.
TW Search Report for Application No. 097150662, Dec. 20, 2013.

* cited by examiner

FEC IN COGNITIVE MULTI-USER OFDMA

RELATED APPLICATIONS

This application is a continuation of U.S. application Ser. No. 11/731,269, filed Mar. 30, 2007 entitled FEC IN COGNITIVE MULTI-USER OFDMA which is incorporated herein in its entirety.

BACKGROUND OF INVENTION

1. Field of Invention

The invention relates generally to wireless communication and more particularly to a system for selecting OFDM subchannels.

2. Discussion of Related Art

Frequency Division Multiplexing (FDM) is a well known process by which multiple signals are modulated on different frequency carrier waves. FDM has been used for decades in radio and television broadcast. Radio and television signals are sent and received on different frequencies, each corresponding to a different "channel."

Orthogonal Frequency Division Multiplexing (OFDM) has also been known in the art at least since the late 1960's. In OFDM, a single transmitter transmits on multiple different orthogonal frequencies simultaneously. Orthogonal frequencies are frequencies that are independent with respect to the relative phase relationship between the frequencies. In OFDM, the available bandwidth is subdivided into a number of equal-bandwidth "subchannels." OFDM is advantageous for broadband wireless communication because it reduces the detrimental effect of multipath interference, ultimately permitting reliable data transmission at higher throughput. OFDM is also known as Discrete Multitone Modulation (DMT). OFDM is employed in many Standards used today for wireless communication. For example, both the IEEE 802.11a wireless LAN Standard and the 802.11g wireless LAN Standard rely on an implementation of OFDM for signal transmission. The next generation Wi-Fi (802.11n) and UWB also use OFDM. One early reference describing OFDM is R. W. Chang, Synthesis of band-limited orthogonal signals for multi-channel data transmission, Bell System Technical Journal (46), 1775-1796 (1966).

OFDM thus functions by breaking one high speed data stream into a number of lower-speed data streams, which are then transmitted in parallel (i.e., simultaneously). Each lower speed stream is used to modulate a subcarrier. This creates a "multi-carrier" transmission by dividing a wide frequency band (or channel) into a number of narrower frequency bands (or subchannels), each modulated with a signal stream. By sending multiple signal streams simultaneously, each at a lower rate, interference such as multipath or Raleigh fading can be attenuated or eliminated without decreasing the overall rate of transmission.

Orthogonal Frequency Division Multiple Access (OFDMA) is an improvement on OFDM. In OFDMA, different sets of subchannels are assigned to different users. OFDMA is employed today in the DVB-RCT specifications for terrestrial interactive TV networks and in the IEEE 802.16a and IEEE 802.16e (mobile WiMAX) specifications for broadband wireless access networks. OFDMA was described in H. Sari and G. Karam, "Orthogonal Frequency-Division Multiple Access and its Application to CATV Networks," European Transactions on Telecommunications & Related Technologies (ETT), Vol. 9, No. 6, pp. 507-516, November-December 1998. OFDMA is also known as Multi-user OFDM.

Cognitive radio is a system used for wireless communication in which transmitters and receivers can alter communications parameters based on a variety of factors. A nonexclusive list of these factors includes the nature of the communication being transmitted, the availability of licensed or unlicensed frequencies, user behavior, network state, noise or other interference at particular frequencies, and detection of other users of bandwidth. Cognitive radio is discussed generally in J. Mitola, III and G. Q. Maguire, Jr., "Cognitive Radio: Making Software Radios More Personal," IEEE Personal Communications, 6(4):13-18, August 1999.

Error correction coding or forward error correction is a method to check that signals have been correctly received and correct errors in transmission when they occur. Generally error correction coding operates by adding some form of redundant data to a message. Different error correction coding schemes tolerate different levels of error transmissions without requiring any data to be retransmitted.

SUMMARY OF INVENTION

This Summary provides an illustrative context for aspects of the invention, in a simplified form. It is not intended to be used to determine the scope of the claimed subject matter. Aspects of the invention are described more fully below in the Detailed Description.

In the claimed invention, a receiver performs error correction decoding on received packets, and uses that information to locate the OFDM subchannels causing errors and thus determine which subchannels are best suited for use.

Described herein are systems and methods for the implementation of a multiuser scheme allowing for a number of users, sets of user, or carriers to share one or more channels. In some embodiments, the available channel bandwidth is subdivided into a number of equal-bandwidth subchannels according to standard OFDM practice. The transmitter is informed by an application that it needs to transmit data a particular rate. The transmitter determines the minimum number of subchannels and maximum interference plus noise power threshold for each subchannel necessary to achieve that data rate and selects a set of subchannels matching those requirements. The subchannels need not be contiguous in the spectrum or belong to the same channel. Once the transmitter has selected the required number of subchannels, it begins transmitting simultaneously on those subchannels across the entire bandwidth used by those subchannels.

The receiver then performs error correction on the interleaved received packets. The error correction decoder will first locate the errors, and thus determine which subchannels cause errors. If the number of bits in error in a given subchannel exceeds a threshold, then the channel is labeled as bad and another channel is used. In various embodiments, either a "hard decision" or a "soft decision" can be made as to which channels cause the most errors. In some embodiments, the receiver then broadcasts a vector indicating which channels are bad and which channels are good, which the sender (or the network) can then use for subchannel selection.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention relates to a novel use of forward error correction to select subchannels for OFDMA transmission. Cognitive selection of OFDMA subchannels is described in copending application Ser. No. 11/410,969 to Hassan et al. In embodiments of the claimed invention, the selection of OFDM subchannels incorporates error coding information as described below. The system thus permits several users or sets of users can share the same bandwidth more efficiently. The invention may be implemented in hardware or software, or some combination thereof. Embodiments include a system, a method, and instructions stored in a computer-readable medium.

Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

The computer-readable media may be transportable such that the instructions stored thereon can be loaded onto any suitable computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the aspects of the present invention discussed below.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Figure 1:
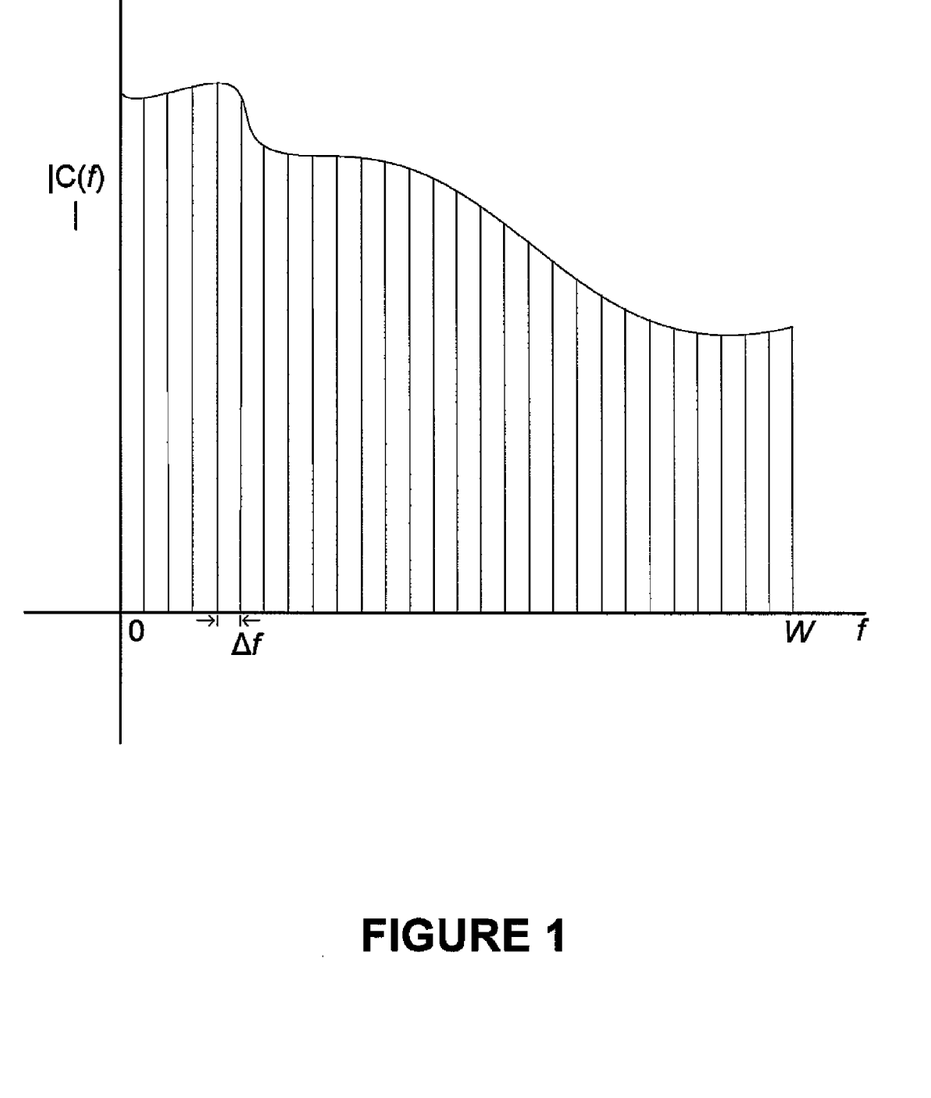
FIG. 1 is a spectrum diagram showing the subdivision of the channel bandwidth to be used into several subchannels of equal width.

As shown in FIG. 1, in OFDM, the available channel bandwidth W is subdivided into a number of equal-bandwidth subchannels. Each subchannel is sufficiently narrow so that the frequency response characteristics of the subchannel are nearly ideal. The number of subchannels is the total available bandwidth divided by the bandwidth of each subchannel. The number of subchannels K can thus be expressed as:

$$K = \frac{W}{\Delta f}$$

Each subchannel k has an associated carrier wave. This carrier wave can be expressed as:

$$x_k(t) = \sin 2\pi f_k t$$

Where $x_k(t)$ is the carrier wave for subchannel k as a function of time t. $f_k$ is the mid-frequency of subchannel k, and k ranges from 0 to K−1.

The symbol rate 1/T is set for each subchannel to be equal to the separation Δf of adjacent subcarriers. The subcarriers will thus be orthogonal over the symbol interval T, independent of the relative phase relationship between subcarriers. This relationship can be expressed as:

$$\int_0^T \sin(2\pi f_k t + \phi_k)\sin(2\pi f_j t + \phi_j)dt = 0$$

Where $f_k - f_j = n/T$, n=1, 2, . . . , independent of the values of the phases $\Phi_k$ and $\Phi_j$.

In an OFDM system, the symbol rate on each subchannel can be reduced relative to the symbol rate on a single carrier system that employs the entire bandwidth W and transmits data at the same rate as the OFDM system. Hence, the symbol interval T (the inverse of the symbol rate) in the OFDM system can be expressed as:

$$T = KT_s$$

Where $T_s$ is the symbol interval of a single-carrier system employing the entire bandwidth W and transmitting data at the same rate as the OFDM system. For example, if the symbol rate across the entire bandwidth for one channel is 72 million symbols per second, and the channel is divided into 48 subchannels, each subchannel would only need to carry 1.5 million symbols per second to achieve the same total data rate. This lower symbol rate reduces inter-symbol interference and thus mitigates the effects of multipath fading. Accordingly, OFDM provides for superior link quality and robustness of communication.

In an OFDM system, the transmitter receives input data in the frequency domain and converts it to a time domain signal. A carrier wave is modulated by the time domain signal for wireless transmission. The receiver receives the signal, demodulates the wave, and converts the signal back to the frequency domain for further processing.

Figure 2:
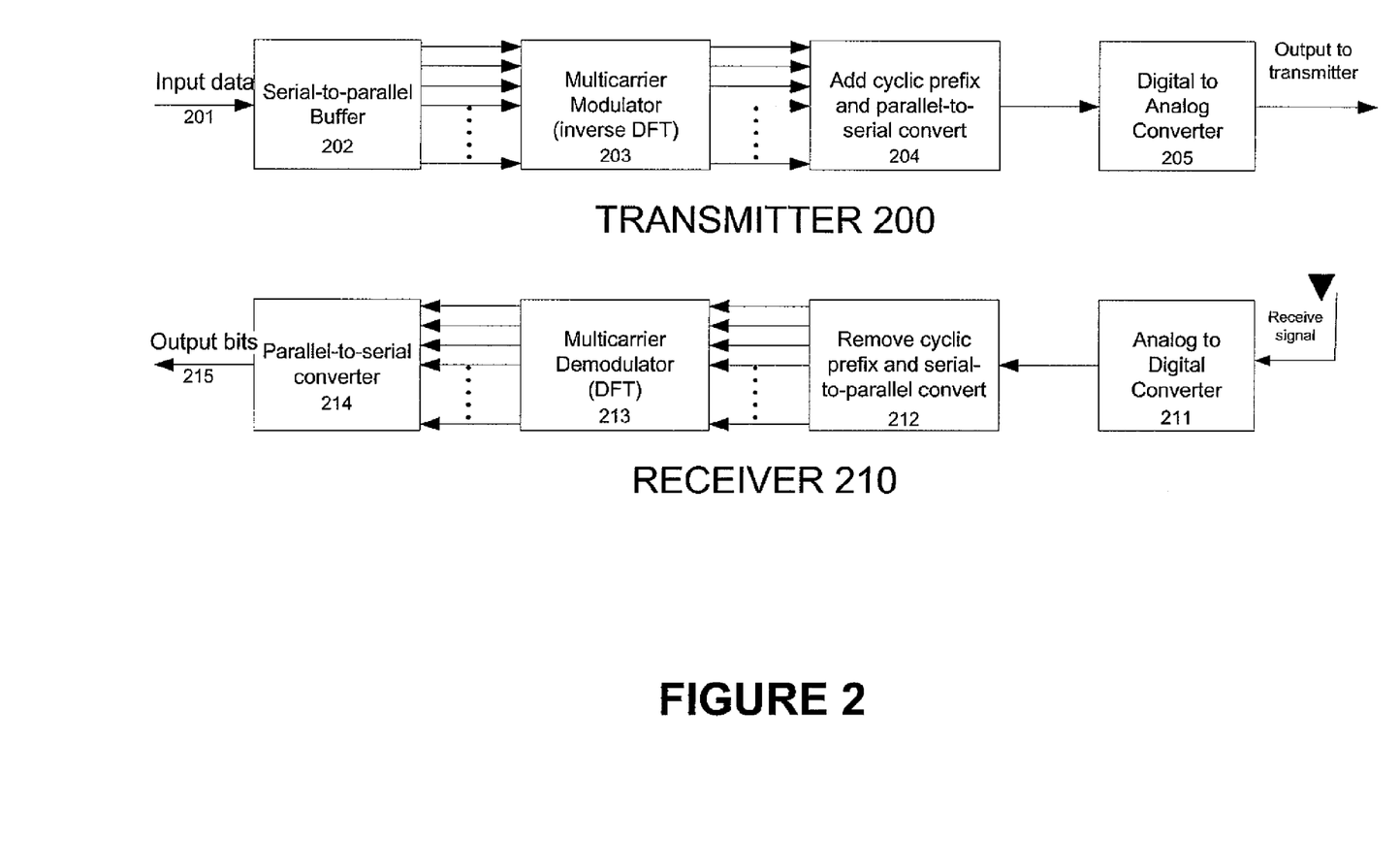
FIG. 2 is a block diagram of a multi-carrier OFDM digital communication system.

A simplified OFDM system is illustrated in FIG. 2. In the illustrated embodiment, the input data stream 201 is provided by the application to the OFDM transmitter 200. In a standard TCP/IP communications stack, this data would be received at the physical layer or data link layer; however, the invention is not limited to any particular source of data or mechanism for providing the data to the transmitter, and could be implemented in hardware or software, and at various layers of the network stack. The input data stream 201 is received by a serial-to-parallel buffer 202. The serial-to-parallel buffer 202 breaks the serial data stream up into several parallel data streams. The number of parallel data streams is normally equal to the number of subchannels selected for OFDM broadcast, or K as used above. In other systems consistent with some embodiments of the invention, more than K parallel streams may be used. The novel process of selecting channels for OFDM broadcast claimed in this patent is discussed below.

In one embodiment, the serial-to-parallel buffer 202 divides the information sequence received from input data 201 into frames of $B_f$ bits. The $B_f$ bits in each frame are parsed into K groups, where the ith group is assigned $b_i$ bits. This relationship may be expressed as:

$$\sum_{i=1}^{K} b_i = B_f$$

Each of the parallel data streams generated by the serial-to-parallel buffer 202 is then sent to a multicarrier modulator 203. The multicarrier modulator 203 modulates each selected subcarrier with each of the parallel data streams. The multicarrier modulator 203 can be efficiently implemented by use of the Inverse Fast Fourier Transform algorithm to compute the time domain signal, although any algorithm may be used that converts a frequency domain signal to a time domain signal.

The multicarrier modulator 203 may use any modulation scheme to modulate each of the incoming data streams. In a preferred embodiment, the signals are modulated with quadrature amplitude modulation (QAM). Any QAM constellation may be used. For example, the modulator may use 16-QAM, 64-QAM, 128-QAM or 256-QAM. A modulation scheme may be selected based on the required data rate, the available subchannels, the noise on each subchannel, or other factors.

In this example, the multicarrier modulator 203 thus generates K independent QAM subchannels, where the symbol rate for each subchannel is 1/T and the signal in each subchannel has a distinct QAM constellation. According to this example, the number of signal points for the ith subchannel can be expressed as:

$$M_i = 2^{b_i}$$

The complex-valued signal points corresponding to the information signals on each of the K subchannels can be represented as $X_k$, where k=0, 1, . . . , K−1. These symbols $X_k$ represent the values of the Discrete Fourier Transform of a multicarrier OFDM signal x(t), where the modulation on each subcarrier is QAM. Since x(t) must be a real-valued signal, its N-point Discrete Fourier Transform $X_k$ must satisfy the symmetry property. Therefore, the system creates N=2K symbols from K information symbols by defining:

$$X_{N-k} = X^*_k, k=1, 2, \ldots, K-1$$

$$X'_0 = Re(X_0)$$

$$X_N = Im(X_0)$$

Here $X_0$ is split into two parts, both of which are real. The new sequence of symbols can be expressed as $X'_k$, where k=0, 1, . . . , N−1. The N-point Inverse Direct Fourier Transform for each subchannel $x_n$ can thus be expressed as:

$$x_n = \frac{1}{\sqrt{N}} \sum_{k=0}^{N-1} X'_k \exp(j2\pi nk/N) \; n = 0, 1, \ldots, N-1$$

In this equation, $$\frac{1}{\sqrt{N}}$$

is a scale factor. The sequence $x_n$ where 0<=n<=N−1 thus corresponds to samples of the multicarrier OFDM signal x(t), consisting of K subcarriers.

A cyclic prefix, which acts a guard interval, is added to each of the parallel modulated waves at 204. This guard interval insures that the subchannels will remain orthogonal, even if multipath fading causes the subcarriers to arrive at the receiver with some delay spread. The parallel streams with the cyclic prefix are then merged back into a single serial stream at 204. Finally, the digital data stream is converted to an analog signal 205, and output for wireless transmission.

The transmitted signal can be received by the receiver 210 and processed to recover the original data stream. First, the analog signal is converted back to a digital signal by an analog to digital converter 211. The cyclic prefix is removed and the separate subcarriers are converted back to separate streams at 212. Each parallel data stream is demodulated by a multicarrier demodulator 213, preferably with a Fast Fourier Transform algorithm. Finally, at 214 the parallel streams are reassembled into a single serial stream and output to the receiving device 215.

Any method may be used to make an initial selection of OFDM subchannels to be used by the transmitter. One example method is illustrated in FIG. 3.

Figure 3:
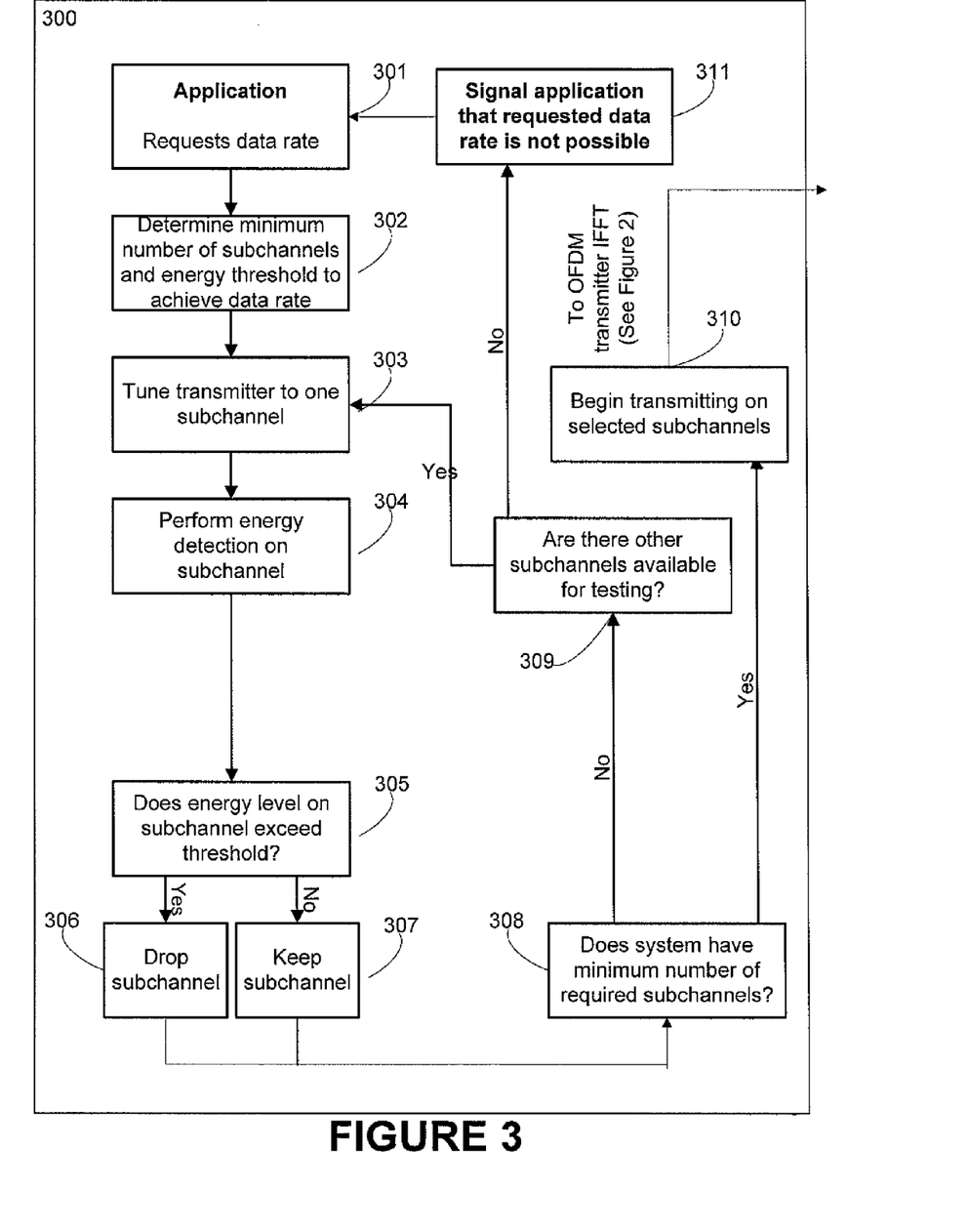
FIG. 3 is a flow diagram illustrating one embodiment of the invention.

FIG. 3 depicts a flowchart illustrating a process that can be utilized by the transmitter to select subchannels to be used. This process could be implemented in hardware or software.

First, an application 301 requests a particular data rate for transmission. This data rate would generally depend on the type of data to be transmitted, but for the purposes of this invention, any arbitrary data rate could be requested.

At 302, the transmitter calculates the minimum number of OFDM subchannels and maximum energy (or noise) threshold for each subchannel that would be necessary to achieve the requested data rate.

The transmitter then begins an iterative process of selecting subchannels to meet the required criteria. At 303, the transmitter tunes to one subchannel from within the spectral range available to it. At 304, the transmitter detects the energy level on that channel. At 305, the transmitter compares the detected energy level with the threshold for that subchannel. If the energy level exceeds the threshold, the subchannel is dropped 306. If it is below the threshold, the subchannel is kept 307.

The system then checks if it has identified a sufficient number of subchannels to meet the requirements at 308. If there are insufficient subchannels, the system checks if there are more subchannels available for testing at 309. If other subchannels are available, the system will return to 303 and test the next available subchannel. If there are no other subchannels available, then the system will signal to the application that the requested data rate is not possible at 311.

Once the system has identified a sufficient number of subchannels, it will then begin transmitting on those selected subchannels at 310. In a preferred embodiment, the Inverse Fourier Transform is performed across the entire bandwidth used by the selected subchannels.

For example, the IEEE 802.11a standard provides for wireless communications in the 5 GHz band of the spectrum. The available spectrum allowed for indoor use in the United States for the 802.11a standard is approximately 5.180 GHz to 5.340 GHz, or 160 MHz wide. That 160 MHz of spectrum is divided up into eight non-overlapping channels, each of which is 20 MHz wide. Each 20 MHz channel may be divided up into 52 subchannels according to OFDM principles, where each subchannel is approximately 300 KHz wide. In this example there would thus be 416 narrowband subchannels that could be used for transmission. To achieve the required data rate, the transmitter could select 20 subchannels that do not exceed a certain threshold for noise or interference. If those subchannels are spread across the first three 20 MHz channels, the transmitter would perform an Inverse Fourier Transform algorithm on the signals across that entire 60 MHz bandwidth. Note that the invention is not limited to any part of the spectrum, any number of subchannels, or any standard for communication.

In an alternative embodiment of the invention, rather than checking the energy level on each subchannel individually as depicted in FIG. 3, the system could check several subchannels at once, or detect energy on all of the subchannels in the entire available spectrum at one time, and then discard the subchannels that exceed the energy threshold.

Various methods may be used by the receiver to determine the subchannels in use. In one embodiment, the receiver performs the same energy detection as the transmitter to identify the correct subchannels. In another embodiment, the receiver receives a signal on a known frequency from the transmitter indicating which subchannels have been selected for transmission. In either of these embodiments, the receiver could perform a conventional Fast Fourier Transform to recover the data. As with the transmitter, the receiver would perform the Fast Fourier Transform across the entire bandwidth used by all of the selected subchannels.

At this point, in one embodiment, the receiver may perform error correction decoding on the received packets. The error correction decoder will first locate the errors, and use this information to identify the subchannels causing the errors. In one embodiment, if the number of bits in error in a given subchannel exceeds a threshold, then the channel is labeled bad. As one example, the threshold could be 50%—in other words, if more than 50% of the bits carried on a given subchannel are bad, the channel itself is tagged as bad. Any threshold may be used, however. In another embodiment, rather than making a "hard" decision to tag a channel as bad at a given threshold, a "soft" decision is made by incorporating several heuristics such as signal strength and other indicators of subchannel conditions.

Figure 4:
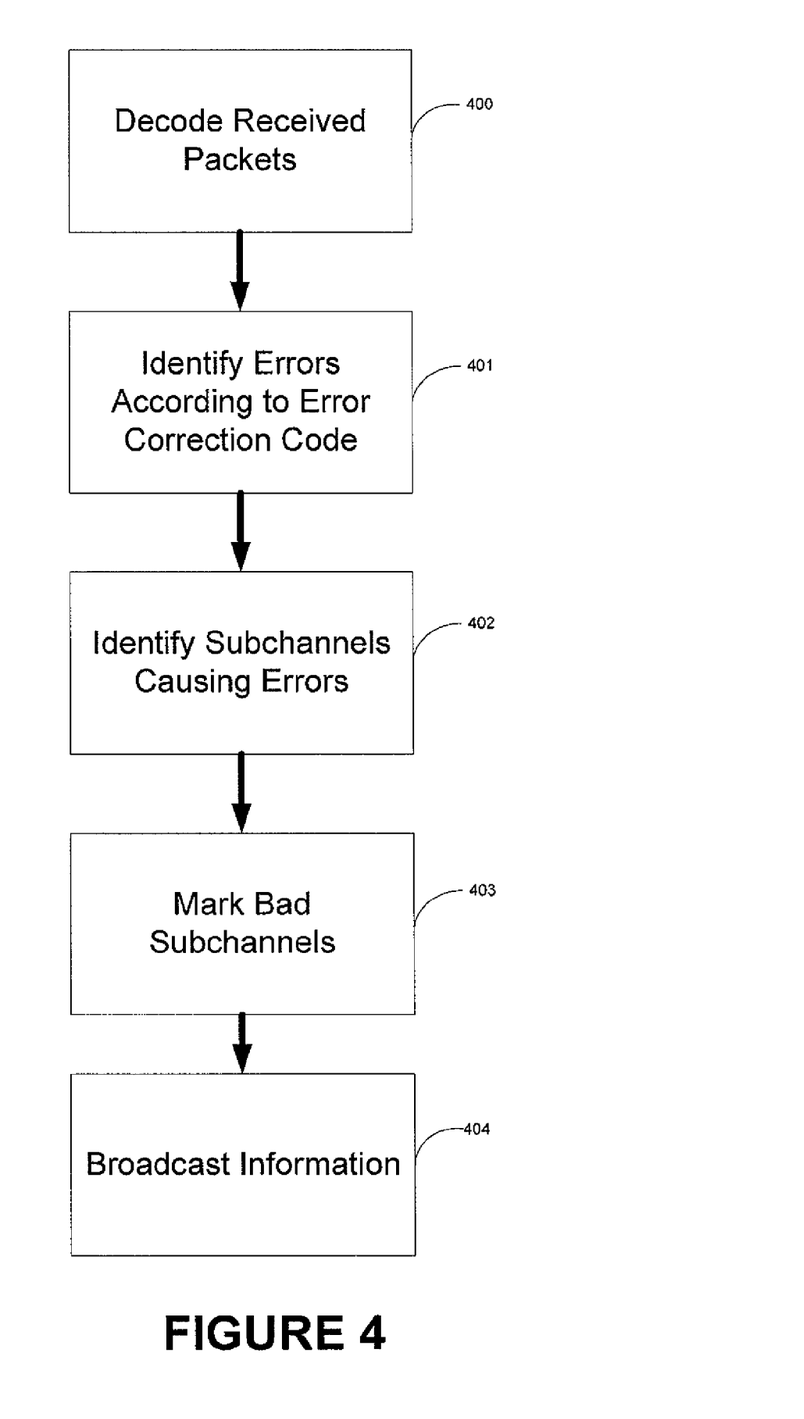
FIG. 4 is a flow diagram illustrating one embodiment of the invention.

The process of detecting and labeling subchannels is depicted in FIG. 4. In the depicted embodiment, the receiver receives and decodes packets 400. In the process of performing error decoding on received packets, the receiver can identify and correct errors 401. Using the collected error information, the receiver then identifies those subchannels causing errors 402. The receiver may then use any algorithm to mark certain subchannels as bad based on detected errors 403. The receiver may also use additional metrics of subchannel condition such as signal strength in step 403 to determine which channels to mark as bad.

Finally, the receiver may broadcast a vector indicating which channels are bad channels and which channels are good channels 404. The sender may receive the vector and use it to relocate transmissions to the better subchannels. Other clients may also use the bad channel information to make subchannel selection. In some embodiments, the receiver repeats the error detection process at a regular interval and updates the error vector so that new subchannels can be selected as conditions change. In other embodiments, the receiver repeatedly broadcasts the error vector at a regular interval (with or without repeating the checking process). For example, the error vector could be broadcast every ten seconds.

In other embodiments, other transmit/receive pairs in the same geographic area follow the same processes to select subchannels. When two or more clients interfere by selecting the subchannel, each client associates a random timer with the subchannel with a timer width depending on the Quality of Service of the application being transmitted. When each client's timer runs out, the client can check whether the subchannel is in use. The first client to check the subchannel should find no interference and can then claim the subchannel. The second client, detecting continued interference, will then relocate to another subchannel. This method can be extended to any number of clients in the same area.

In another embodiment, a transmitter listens to available subchannels for a certain period of time. The transmitter attempts to find a set of subchannels that (1) were not previously reported by its intended receiver as being bad, and (2) are not sensed to be bad by the transmitter. If the transmitter identifies a sufficient number of subchannels that satisfy these conditions, the transmitter will transmit immediately; otherwise, it will check back after a random time interval. In some embodiments, the random time interval can depend on the Quality of Service requirements of the application being transmitted.

Figure 5:
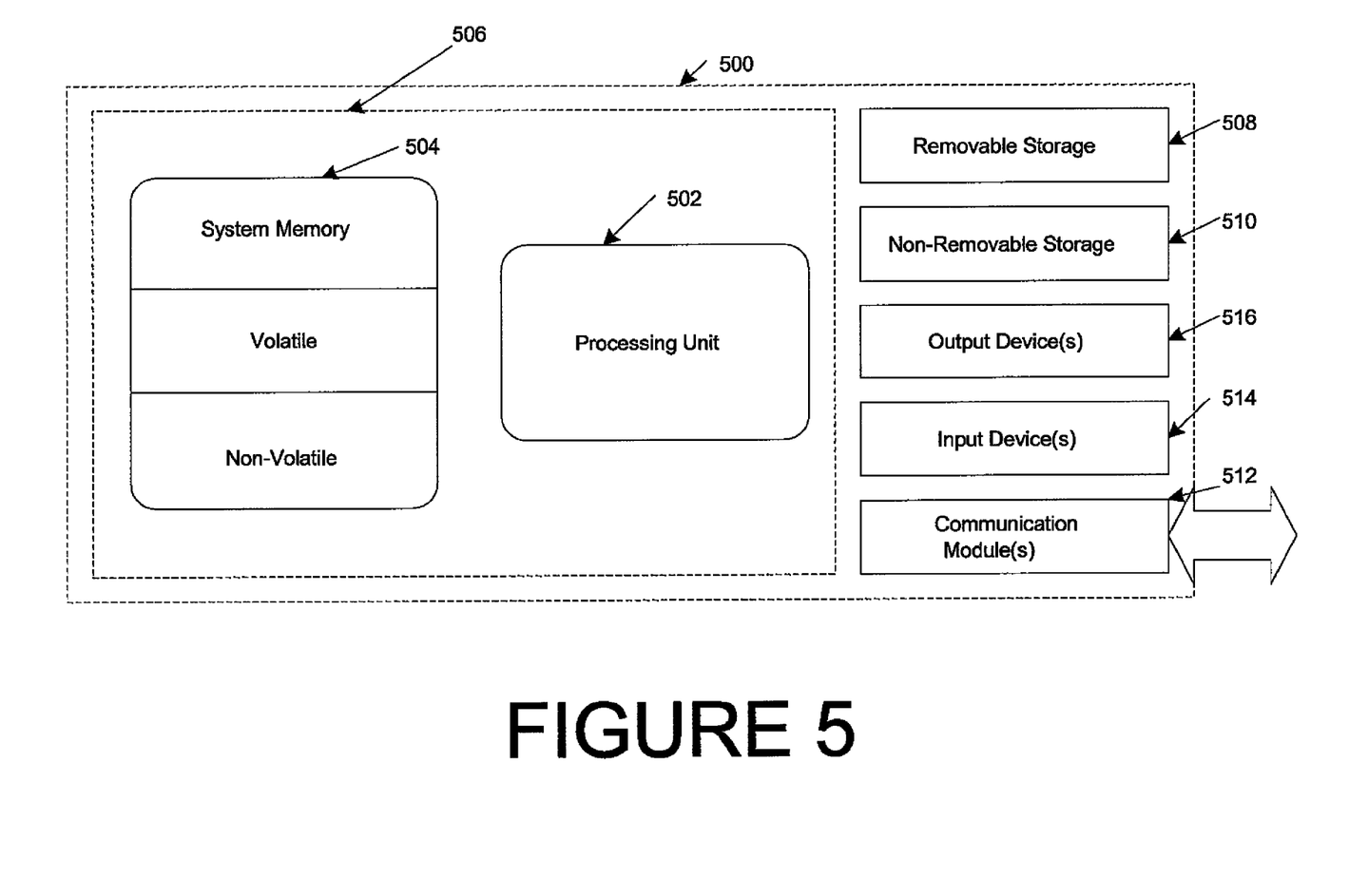
FIG. 5 is a diagram of a system that implements some aspects of the invention.

A general-purpose computing system will now be described, on which embodiments of the invention may be implemented. With reference to FIG. 5, an exemplary system for implementing embodiments of the invention includes a computing device, such as computing device 500, which may be a device suitable to function as a node of network environment. Computing device 500 may include at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506. Additionally, device 500 may also have additional features/functionality. Memory 504 is a form of computer-readable media that may store instructions, having wireless medium parameters for various nodes in network environment.

Device 500 may include at least some form of computer readable media. Computer readable media can be any available media that can be accessed by device 500. By way of example, and not limitation, computer readable media may comprise computer storage media and communication media. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Device 500 may also contain communications connection(s) 512 that allow the device to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 500 may also have input device(s) 514 such as keyboard, mouse, pen, voice input device, touch input device, etc. Output device(s) 516 such as a display, speakers, printer, etc. may also be included. All these devices are well know in the art and need not be discussed at length here.

It should be appreciated that the invention is not limited to executing on any particular system or group of systems. For example, embodiments of the invention may run on one device or on a combination of devices. Also, it should be appreciated that the invention is not limited to any particular architecture, network, or communication protocol.

Having now described some embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. The foregoing description and drawings are by way of example only. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of wireless communication comprising the acts, carried out by a first computing device, of:
   a) detecting transmission errors on a set of OFDM subchannels based on decoding received wireless communications using an error correction code, the received wireless communications being received with a receiver;
   b) identifying a plurality of undesirable subchannels from the set of OFDM subchannels based at least in part on the errors detected in act (a); and
   c) broadcasting an identity of the plurality of undesirable subchannels in a transmitted wireless communication.

2. The method of claim 1, further comprising the act by a second computing device of receiving the broadcast of the identity of the plurality of undesirable subchannels.

3. The method of claim 2, further comprising, on the second computing device, selecting OFDM subchannels for transmission based at least in part on the received broadcast by selecting subchannels not identified as undesirable in the received broadcast before selecting subchannels in the received identity.

4. The method of claim 2, further comprising, on at least one third computing device, selecting OFDM subchannels for transmission based at least in part on the received identity of the plurality of undesirable subchannels by selecting subchannels not in the received identity before selecting subchannels in the received identity.

5. The method of claim 1, wherein:
   identifying a plurality of undesirable subchannels based at least in part on the errors detected comprises comparing a number of errors detected to a dynamically determined threshold, the threshold being dynamically determined based one or more indicators of subchannel conditions.

6. The method of claim 1, wherein identifying the plurality of undesirable subchannels comprises identifying subchannels of the set of OFDM subchannels in which more than a predetermined percentage of transmitted bits are detected in error.

7. The method of claim 1, wherein the identifying the plurality of undesirable subchannels further comprises identifying based on a detected signal strengths for each of the set of OFDM subchannels.

8. The method of claim 1, further comprises repeating the detecting, identifying, and broadcasting periodically.

9. A wireless receiver for receiving OFDM transmissions, the receiver comprising:
   at least one processor programmed to act as:
   an error detection module for determining transmission errors on a set of OFDM subchannels based on decoding received wireless communications using an error correction code;
   an identification module for identifying low fidelity subchannels from the set of OFDM subchannels based at least in part on the determined transmission errors; and
   a broadcasting module for broadcasting a vector representing the low fidelity subchannels.

10. The receiver of claim 9, wherein the identification module uses a hard decision model to identify low fidelity subchannels, the hard decision model being based on a predetermined percentage of errors.

11. The receiver of claim 10, wherein:
    the identification module identifies subchannels as low fidelity by comparing a number of errors detected to a dynamically determined threshold in each of a plurality of subchannels; and
    for each of the plurality of subchannels, the threshold is dynamically determined based on a signal strength in the subchannel.

12. The receiver of claim 9, wherein the identification module uses a soft decision model to identify low fidelity subchannels.

13. The receiver of claim 9, wherein the broadcasting module broadcasts a vector representing the low fidelity subchannels at a programmable frequency.

14. A system comprising the wireless receiver of claim 9, a transmitter, and at least one computing device different from the transmitter and receiver,
    wherein the at least one computing device comprises at least one processor programmed to receive the vector from the wireless receiver and to select OFDM subchannels for transmission based at least in part on the vector by selecting subchannels not in the vector before selecting subchannels in the vector.

15. A computer-readable storage medium having computer-executable instructions that, as a result of being executed by a computer, instruct the computer to perform a method of wireless communication, the method comprising acts carried out by a first computing device of:
  a) wirelessly receiving data in an OFDM signal;
  b) performing error detection on the received data by decoding received wireless communications using an error correction code;
  c) identifying OFDM subchannels in which errors were detected, based on the error detection in b); and
  d) advertising the OFDM subchannels in which errors were detected.

16. The computer-readable storage medium of claim 15, wherein the method further comprises detecting interference from other transmitters.

17. The computer-readable storage medium of claim 16, wherein the method further comprises pausing data transmission for a random time interval when interference from other transmitters is detected.

18. The computer-readable storage medium of claim 16, wherein the method further comprises the following steps when interference is detected from other transmitters:
  a) if a sufficient number of non-interfering error-free subchannels are available, transmitting on the non-interfering error-free subchannels; and
  b) if a sufficient number of non-interfering error-free subchannels are not available, pausing data transmission for a random time interval before repeating the steps of claim 15.

19. The computer-readable storage medium of claim 15, wherein advertising the OFDM subchannels in which errors were detected comprises advertising the OFDM subchannels in which more than fifty percent of transmissions are errors.

20. The computer-readable storage medium of claim 15, wherein the step comprising receiving data sent across an OFDM spectrum is performed according to the IEEE 802.11 (a), IEEE 802.11(b), or IEEE 802.11(g) standards.

\* \* \* \* \*